United States Patent Office 3,022,971
Patented Feb. 27, 1962

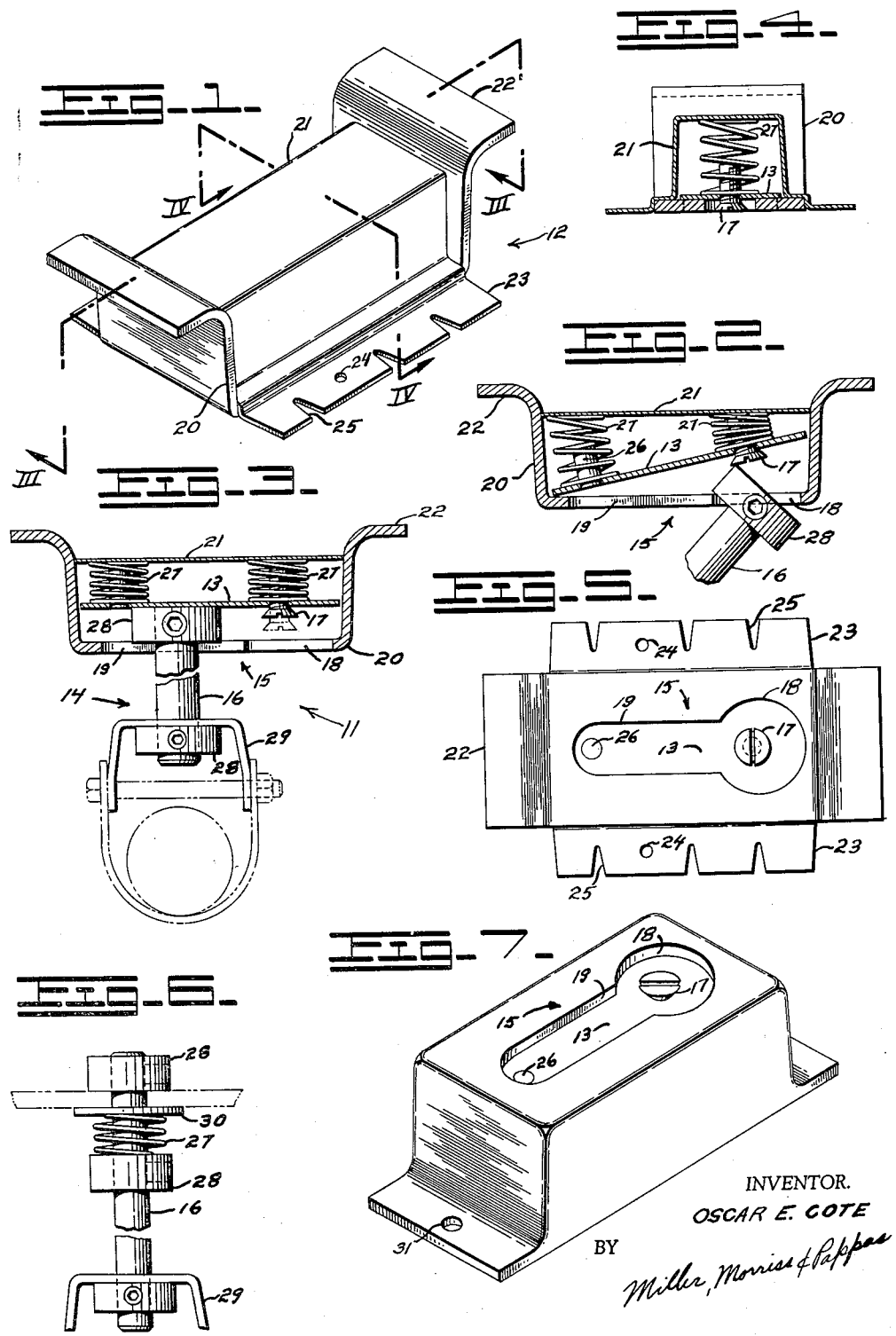

3,022,971
PIPE HANGER INSERT STRUCTURE
Oscar E. Cote, 2039 Culver St., Lansing, Mich.
Filed June 11, 1959, Ser. No. 819,641
6 Claims. (Cl. 248—58)

This invention relates to a pressure lock structure for headed connectors and more particularly to an insert housing provided with a yieldably biased pressure plate to pressure retain headed support elements selectively insertable therein.

Several types of pipe hanger assemblies have heretofore been utilized in the construction of buildings to provide support for pipes from the ceilings of such buildings. Such pipe hanger assemblies have generally utilized complicated ceiling insert housings which are difficult and expensive to fabricate. In addition, pipe support rods or assemblies of special design have been necessary to engage such insert housings. These specially designed pipe support rods or assemblies have not only been expensive to fabricate, but have not had the desired flexibility in use.

Variations in job-to-job specifications has required the availability of various lengths and sizes of pipe support rods or assemblies. However, previous pipe support rods or assemblies have, of necessity, been independently manufactured in various sizes and sold to contractors for subsequent use on construction jobs. In instances where job requirements or economic desirability has necessitated on-the-job fabrication of such pipe support rods or assemblies, time consuming threading of rods and assembly of such units has taken the time of highly paid construction workers who could otherwise have been utilized on actual construction.

Another problem encountered in the use of pipe support members has been the fact that once pipe support rods or assemblies have been inserted into the insert housings they are not under any retentive pressure that would hold them against inadvertent displacement due to vibration or accidental bumping. It has been impossible to align such support rods or assemblies and have them retain such alignment until the pipe has actually been hung. The requirement for constant attention to insure proper alignment of support rods or asemblies has proven expensive because highly paid construction workers must devote their efforts to non-productivity activity.

Furthermore, the known insert housings of the prior art have not provided for longitudinal horizontal adjustability of pipe support rods r assemblies after they have been placed within the insert housings. For this reason, time consuming care has been necessary to insure the proper installation of insert housings into the ceilings so that the pipe support rods or assemblies are suspended at the proper point as required by the construction specifications.

In addition, insert housings for headed connectors have been utilized in fields other than the pipe hanger field. Such housings are utilized in the chain lock devices for doors. Generally, complicated safety lock auxiliary devices are incorporated into such chain locks to insure against removal of such head connectors from the housings by children.

It is therefore an object of this invention to provide a pipe hanger structure having an insert housing provided with a spring-loaded plate to pressure retain headed pipe support rods or assemblies placed therein.

Another object of this invention is to provide a pipe hanger structure having pipe support rods requiring no threading operation in fabrication or assembly.

Still another object of this invention is to provide a pipe hanger structure having pipe support rods utilizing detachable collar elements to provide insert and load engaging surfaces.

Yet another object of this invention is to provide a pipe hanger structure utilizing an insert housing permitting longitudinal horizontal adjustment of pipe support rod asemblies suspended therefrom.

A still further object of this invention is to provide a pipe hanger structure having great versatility in use and permitting quick assembly of pipe support elements at the job site.

A still further object of this invention is to provide a pressure lock structure utilizing a slotted housing provided with a resiliently biased pressure plate for the pressure retention of headed connector elements inserted within the housing.

Another object of this invention is to provide a pressure lock structure utilizing a yieldably biased pressure plate having a stop element to pressure retain a headed connector within and prevent accidental removal from a slotted housing.

In the drawings:

FIGURE 1 is a perspective view illustrating the outer configuration of the insert housing.

FIGURE 2 is a cross-sectional view of the insert illustrating the pipe support rod assembly being inserted into the insert housing, thus displacing the spring-loaded pressure plate.

FIGURE 3 is a cross-sectional view of the threadless hanger taken on line IIII—III of FIGURE 1, illustrating the pipe support rod assembly in its use position being pressuringly retained by the pressure plate.

FIGURE 4 is a cross-sectional view of the insert taken on line IV—IV of FIGURE 1 illustrating the configuration of the housing member and the spring-loaded pressure plate provided with an adjustable pipe support rod retainer bolt member extending therethrough. For purposes of clarity, the pipe support rod assembly is not shown in the insert.

FIGURE 5 is a bottom view of the insert illustrating the configuration of the elongated pipe support rod assembly receiving slot provided in the base member.

FIGURE 6 is a partial schematic view illustrating an alternate threadless pipe support rod assembly for use on inserts wherein the spring-loaded feature is utilized on the exterior of the base wall.

FIGURE 7 is a perspective view of an alternate configuration of the pressure lock structure for use to pressure retain a headed connector in a door chain lock assembly.

*General Description*

In general, a pipe hanger assembly 11 is provided having an insert housing member 12 utilizing a yieldably biased pressure plate 13 to retain a threadless pipe support rod assembly 14 inserted therein. The insert housing 12 is provided with an elongate keyhole slot 15 in its base wall portion through which a headed pipe support rod 16 is selectively insertable and removable from said insert housing 12, as shown in FIGURE 3. The pressure plate 13 exerts a retentive pressure against the head of a pipe support rod 16 which has been inserted into the insert housing 12 through the keyhole slot 15 as shown in FIGURE 2. The pressure plate 13 is also provided with a head stop 17 which extends into the enlarged portion 18 of the keyhole slot 15 so as to prevent accidental removal of the headed connector or support element from the insert housing 12.

The insert housing 12 is configured so that it may be fastened to a ceiling or other wall surface so as to be in position to receive the headed end of a pipe support rod assembly. The pipe support rod assembly consists of collar elements provided on the support rod to create a head portion for insertion into the insert housing and a load engaging support shoulder portion, as shown in FIGURE 3.

It is thus seen that a threadless pipe hanger assembly is provided that not only has great flexibility in use but requires little or no time consuming assembly or alignment adjustments in use. The structure of the instant invention also provides for positive retention of headed pipe support rods against accidental dislodgement while permitting the ease of adjustment and engagement.

More broadly, an effective pressure lock structure for headed connectors is provided for use not only in the pipe hanger field but which is adaptable for use in the lock field as herein described.

Specific Description

In the preferred embodiment, the insert housing 12 consists of base member 20 and a cover member 21. The base member 20 is of a substantially U-shaped configuration and is provided with outwardly extending end portions or flanges 22. The base member 20 is formed from an elongate rectangular piece of cold rolled steel and is provided with an elongate keyhole slot 15 having an enlarged portion 18 and a connecting elongate narrow portion 19 so as to receive and retain the headed portion of a pipe support rod or connector 16.

The cover member 21 is also of substantially U-shaped configuration and matingly nestles within the base member 20 to form the insert housing 12. The outwardly extending end portions 23 of the cover member 21 are provided with positioning holes 24 which indicate the center point of the range of longitudinal adjustability that the insert housing 12 affords the pipe support rod assembly 14. The headed portion of the pipe support rod assembly 14 within the insert housing 12 may be slidably moved between the end wall of the housing insert 12 and the adjustable stop 17 without being removed from the insert housing 12. Nailing notches 25 are also provided in the cover end portions 23 to afford maximum ease and flexibility of installation.

A pressure plate 13 is provided which is of an elongate rectangular configuration so as to slidably nestle between the vertical side portions of the base member 20 and cover the slotted central portion thereof. The pressure plate 13 is provided with an upright spring stop 26 near one end thereof and an adjustable retaining screw stop 17 near the other end thereof. The pressure plate 13 is positioned upon said base member 20 so that the screw stop 17 may be selectively extended downwardly through or toward the enlarged portion 18 of the keyhole slot 15, as shown in phantom line in FIGURE 3.

The end of the screw stop 17 extends above the pressure plate 13 to act as a second spring retaining stop, as shown in detail in FIGURE 4.

A pair of coil springs 27 are positioned to back the pressure plate 13, as shown in FIGURES 2 and 3. The springs 27 are not anchored to the plate 13 but are free to move, being restricted in longitudinal movement only by the spring stop 26 and the upper end of the screw stop 17 which extend into the central core area of the springs 27. It is within the scope of the present invention to yieldably bias the pressure plate 13 by use of a leaf spring, foam rubber padding or other suitable resiliently yieldable means.

The cover member 21 is fitted over the pressure plate 13 and coil springs 27 to yieldably retain the pressure plate 13 against the slotted portion of the base member 20. The cover member 21 is then welded to the base member 20, thus forming the insert housing 12 containing the spring loaded pressure plate 13 therein.

Although the above described insert housing provides ease, economy, and simplicity of manufacture, it is within the scope of the invention to fabricate the housing in any other accepted manner. A unitary housing could be utilized having a removable outer face plate containing the keyhole slot 15. Such a removable plate would provide easy access to the inside of the housing in the event the spring means and pressure plate became fouled and thus, inoperative. In addition, a housing, such as shown in FIGURE 7, may be utilized when the insert housing is to form a part of a chain lock apparatus. In the device of FIGURE 7, the stop 17 provided in the pressure plate 13 need not be adjustable but may consist of a downwardly depending peg of such length to permit insertion and removal of the headed portion of a connector when the pressure plate is depressed.

The pipe support rod 16 is cut to any desired length from standard rod stock. Collars 28 are formed from steel tubing and are provided with set screws so that the collars may be attached to the rod 16 as shown in FIGURE 3. The collar 28 provided at one end of the rod and forming a head thereof is insertable into the enlarged portion 18 of keyhole slot 15 of the base member 20 as shown in FIGURE 2.

In its use position, as shown in FIGURE 3, the upper collar 28 is located within the insert housing 12. The pipe support rod 16 is supported by the collar 28 and depends downwardly through the narrow portion 19 of the keyhole slot 15. The collar 28 is at all times under the retentive pressure of the spring-loaded pressure plate 13. The collar or head portion 28 may be moved longitudinally within the insert housing 12. This longitudinal movement is limited by the vertical wall of the base member 20 and the screw stop 17 which depends downwardly from the pressure plate 13, as shown in FIGURE 3.

Additional collars are attached to the pipe support rod to engage a pipe support yoke assembly 29 which supports the actual pipe as shown in FIGURE 3 in phantom line.

It is thus seen that an easily fabricated and easily assembled threadless pipe hanger assembly is provided having versatility in use and stability in operation.

An alternate pipe support rod assembly structure is shown in FIGURE 6. A washer 30, spring 27 and collar 28 are provided on the rod 16 whereby the washer 30 is spring-loaded to bear upward against the bottom of an insert housing wall. The alternate structure shown in FIGURE 6 may not only be used to supplement the spring-loaded action of the pressure plate 13 against the upper collar member 28, but it may be used with insert structures of the prior art so as to provide pressure retention of headed support rods or connectors without the necessity of modifying existing inserts to provide pressure plates therein.

Thus, the use of the insert structures of the present invention provides a pressure lock structure which eliminates inadvertent movement of the headed pipe support rods or connectors which have been inserted therein. This inadvertent movement is usually caused by accidental bumping or more often by the extreme vibrations found on construction projects. When the pressure lock structure is used as part of a chain lock assembly, it eliminates accidental removal of the headed connector by children.

Operation

After the insert housings 12 have been fabricated containing the yieldably biased pressure plates as described above, they are ready for use as chain lock inserts or on construction projects where various types of pipe are to be hung. As stated previously, it is within the scope of this invention to manufacture such insert housing by any manner as long as a yieldably biased pressure plate and elongate keyhole slot is provided therein for the pressure retention of headed support rods or connectors.

The insert housings 12 are then placed into longitudinally aligned position in the ceilings of buildings under construction so as to be in position to receive pipe support rods which in turn receive pipes that are required in the construction and operation of the buildings. The insert housing 12 is located in the ceiling so that the keyhole slot 15 is exposed and accessible from below as shown in FIGURE 2. The center locator holes 24 provided in the housing member 12 are positioned to conform with the location of insert housing required in the plans and specifications. In this manner, pipe rod support assemblies are afforded longitudinal adjustment in either direction of the exact suspension point called for in the plans and specifications.

The pipe support rod assemblies 14 may be prepared on the job by cutting off desired lengths of pipe support rods 16 from rod stock. Collars 28 are affixed to the rods 16 as shown in FIGURE 3. After the desired number of pipe support rod assemblies have been assembled, or as they are individually assembled, they may be inserted into the insert housings 12 and aligned so as to receive the pipe as shown in FIGURE 3.

The adjustment screw stop 17 is then screwed toward the enlarged portion 18 of the slot 15, as shown in FIGURE 3, so as to prevent accidental removal of the support rod connector. It is within the scope of the invention to utilize a pressure plate having a fixed stop which extends into the enlarged portion of the keyhole slot. As the head portion of the connector is inserted into the housing, it encounters the stop. As the head or collar portion 28 is forced into the housing 12, the pressure plate 13 tiltably yields and permits the head portion to be moved into the housing and over the narrow portion 19 of the keyhole slot 15. The pressure plate then assumes a horizontal position which lowers the stop 17 toward the enlarged portion 18 of the keyhole slot 15. The head or collar portion 28 of the connector element cannot be removed from the housing unless the stop 17 is initially moved inwardly to allow the head portion 28 of the connector element to enter the enlarged portion 18 of the keyhole slot 15 and thus be removed from the housing 12. Mounting holes 31 are provided in the flanged portion of the modified insert shown in FIGURE 7 to facilitate mounting of the insert on a wall or door.

It is thus seen that a vibration and tamper-proof insert housing is provided whereby headed pipe support rods or connectors may be pressure retained therein while maintaining the necessary flexibility in use.

Various modifications of the invention may be made without departing from the principle thereof. Each of these modifications is to be considered as included in the hereinafter appended claims unless these claims by their language expressly provide otherwise.

Having thus set forth the nature of my invention, I claim the following:

1. In a threadless pipe hanger assembly, the combination including: an elongate insert housing adapted to be fastened to a ceiling and having a base wall portion, said base wall portion defining a keyhole slot having an enlarged portion and a connecting narrow portion; an elongate movable horizontally-oriented pressure plate provided within said insert housing, said pressure plate abutting the inner surface of said base wall portion so as to cover said keyhole slot; spring means provided within said insert structure and above said pressure plate so as to yieldably bias said pressure plate downward against said base wall portion; and a pipe support rod assembly having a head portion insertable through the enlarged portion of said keyhole slot and movable over the narrow portion of said keyhole slot so as to displace said pressure plate upwardly against said spring means, said head portion lockably retained in position against said base wall portion by said displaced pressure plate.

2. In a threadless pipe hanger assembly as claimed in claim 1 wherein the pipe support rod assembly comprises: a threadless elongate rod support member; an uppermost detachable collar provided at one end of said rod member so as to form an insert housing engaging head portion on said rod member; and a lowermost detachable collar provided proximate to the other end of said rod support member so as to form a pipe support yoke engaging shoulder portion on said rod member.

3. In a threadless pipe hanger assembly the combination including: an insert housing adapted to engage a ceiling and having a base wall portion, said base wall portion defining a keyhole slot having an enlarged portion and a connecting narrow portion; a horizontally-oriented pressure plate provided within said insert housing and substantially coextensive with said base wall portion; resiliently yieldable means provided within said insert housing and above said pressure plate so as to urge said pressure plate downwardly against said base wall portion; a pipe support rod having a head portion insertable through the enlarged portion of said keyhole slot so as to displace said pressure plate upwardly, said head portion movable within said housing structure so as to suspend said rod downwardly through the narrow portion of said keyhole slot, said base wall portion and pressure plate cooperating to pressure retain said head portion in a pre-determined position in said insert housing.

4. In a pressure lock structure for headed connectors, the combination comprising: a housing provided with a keyhole slotted opening; a horizontally-oriented movable pressure plate provided in said housing covering said keyhole opening; a spring element yieldably provided within said housing member above each end of said pressure so as to yieldably urge said pressure plate downwardly so as to cover said keyhole opening; an upwardly extending spring stop element provided on said pressure plate in substantial co-axial alignment with one of said spring elements; and an adjustable screw stop element provided through the end of said pressure plate opposite said spring stop, said screw stop in substantial co-axial alignment with the other of said spring elements and in register with the enlarged portion of said keyhole opening.

5. In a pressure lock structure for headed connectors, the combination comprising: an elongate housing having a wall portion defining a keyhole slotted opening, said keyhole slotted opening having an enlarged portion and a connecting narrow elongate portion to permit selective positioning of headed connectors therealong; an elongate movable pressure plate provided within said housing, said pressure plate co-extensive with and abutting said wall portion so as to cover said keyhole slotted opening; and spring means provided within said housing member yieldably urging said pressure plate against said wall portion so as to exert a constant retentive pressure at all points along said keyhole slotted opening.

6. In a pressure lock structure for headed connectors, the combination comprising: an elongate housing having a wall portion defining a keyhole slotted opening, said keyhole slotted opening having an enlarged portion and a connecting narrow elongate portion to permit selective positioning of headed connectors therealong; an elongate movable pressure plate provided within said housing, said pressure plate co-extensive with and abutting said wall portion so as to cover said keyhole slotted opening; spring means provided within said housing member yieldably urging said pressure plate against said wall portion so as to exert a constant retentive pressure at all points along said keyhole slotted opening; and a stop element provided on said movable pressure plate, said stop element extending outwardly from said pressure plate in register with the enlarged portion of said keyhole slotted opening so as to provide lock retention of headed connectors engaging said keyhole slotted opening.

References Cited in the file of this patent

UNITED STATES PATENTS

| 240,032 | Limbright | Apr. 12, 1881 |
| 1,049,085 | Healy | Dec. 31, 1912 |
| 1,146,686 | Branch | July 13, 1915 |
| 1,201,540 | Banes | Oct. 17, 1916 |
| 1,260,331 | Collings | Mar. 26, 1918 |

FOREIGN PATENTS

| 3,442 | Great Britain | Sept. 12, 1877 |
| 1,049,779 | France | Aug. 26, 1953 |

UNITED STATES PATENT OFFICE
CERTIFICATE OF CORRECTION

Patent No. 3,022,971                          February 27, 1962

Oscar E. Cote

It is hereby certified that error appears in the above numbered patent requiring correction and that the said Letters Patent should read as corrected below.

Column 1, line 46, for "non-productivity" read -- non-productive --; line 49, for "r" read -- or --; column 2, line 34, for "IIII-III" read -- III-III --; column 6, line 37, before "so" insert -- plate --.

Signed and sealed this 18th day of September 1962.

(SEAL)
Attest:

ERNEST W. SWIDER
Attesting Officer

DAVID L. LADD
Commissioner of Patents